United States Patent
Kachi

(10) Patent No.: US 8,976,260 B2
(45) Date of Patent: Mar. 10, 2015

(54) IMAGE PROCESSING APPARATUS AND IMAGE PROCESSING METHOD

(71) Applicant: Canon Kabushiki Kaisha, Tokyo (JP)

(72) Inventor: Yasushi Kachi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 13/796,582

(22) Filed: Mar. 12, 2013

(65) Prior Publication Data

US 2013/0258147 A1  Oct. 3, 2013

(30) Foreign Application Priority Data

Mar. 30, 2012 (JP) ................................. 2012-079536

(51) Int. Cl.
  H04N 5/228  (2006.01)
  H04N 9/07   (2006.01)
  H04N 9/04   (2006.01)

(52) U.S. Cl.
  CPC . *H04N 9/07* (2013.01); *H04N 9/045* (2013.01)
  USPC ...................................... 348/222.1; 348/280

(58) Field of Classification Search
  USPC ............................ 348/207.1, 222.1, 234, 280
  See application file for complete search history.

(56) References Cited

U.S. PATENT DOCUMENTS

| | | | |
|---|---|---|---|
| 6,690,810 B2 * | 2/2004 | Ito ................................. | 382/100 |
| 2006/0238548 A1 * | 10/2006 | Stotts Jr. et al. ............. | 345/629 |
| 2009/0059096 A1 * | 3/2009 | Yamamoto et al. ........... | 348/746 |
| 2011/0205247 A1 * | 8/2011 | Yamashita .................... | 345/660 |
| 2012/0206582 A1 * | 8/2012 | DiCarlo et al. ............ | 348/222.1 |

FOREIGN PATENT DOCUMENTS

JP  2002-199414  7/2002

* cited by examiner

*Primary Examiner* — Gevell Selby
(74) *Attorney, Agent, or Firm* — Cowan, Liebowitz & Latman, P.C.

(57) ABSTRACT

An image processing apparatus obtains moving image data having a pixel array of a Bayer structure, transmits the obtained moving image data in accordance with a transmission method of transmitting image data having a pixel array different from the Bayer structure and auxiliary data indicating transparency of a plurality of pieces of color data included in the image data by using a plurality of channels, and controls image data of predetermined one of a plurality of colors where the number of pixels corresponding to the predetermined color is larger than that of other color of the plurality of colors, by using a channel for transmitting the auxiliary data.

12 Claims, 15 Drawing Sheets

FIG. 2

| R  | Gr | R  | Gr | R  | Gr | R  | Gr |
|----|----|----|----|----|----|----|----|
| Gb | B  | Gb | B  | Gb | B  | Gb | B  |
| R  | Gr | R  | Gr | R  | Gr | R  | Gr |
| Gb | B  | Gb | B  | Gb | B  | Gb | B  |
| R  | Gr | R  | Gr | R  | Gr | R  | Gr |
| Gb | B  | Gb | B  | Gb | B  | Gb | B  |
| R  | Gr | R  | Gr | R  | Gr | R  | Gr |
| Gb | B  | Gb | B  | Gb | B  | Gb | B  |

FIG. 5A

RED

|   | | | | | | |
|---|---|---|---|---|---|---|
| 1 | R | R | R | R | ... | R | R |
| 2 | R | R | R | R | ... | R | R |
| 3 | R | R | R | R | ... | R | R |
| 4 | R | R | R | R | ... | R | R |
|   | ⋮ | ⋮ | ⋮ | ⋮ |  | ⋮ | ⋮ |
| 1079 | R | R | R | R | ... | R | R |
| 1080 | R | R | R | R | ... | R | R |

FIG. 5B

GREEN (Gr)

|   | | | | | | |
|---|---|---|---|---|---|---|
| 1 | Gr | Gr | Gr | Gr | ... | Gr | Gr |
| 2 | Gr | Gr | Gr | Gr | ... | Gr | Gr |
| 3 | Gr | Gr | Gr | Gr | ... | Gr | Gr |
| 4 | Gr | Gr | Gr | Gr | ... | Gr | Gr |
|   | ⋮ | ⋮ | ⋮ | ⋮ |  | ⋮ | ⋮ |
| 1079 | Gr | Gr | Gr | Gr | ... | Gr | Gr |
| 1080 | Gr | Gr | Gr | Gr | ... | Gr | Gr |

FIG. 5C

GREEN (Gb)

|  | | | | | | |
|---|---|---|---|---|---|---|
| 1 | Gb | Gb | Gb | Gb | ... | Gb | Gb |
| 2 | Gb | Gb | Gb | Gb | ... | Gb | Gb |
| 3 | Gb | Gb | Gb | Gb | ... | Gb | Gb |
| 4 | Gb | Gb | Gb | Gb | ... | Gb | Gb |
| | ⋮ | ⋮ | ⋮ | ⋮ | | ⋮ | ⋮ |
| 1079 | Gb | Gb | Gb | Gb | ... | Gb | Gb |
| 1080 | Gb | Gb | Gb | Gb | ... | Gb | Gb |

FIG. 5D

BLUE

|  | | | | | | |
|---|---|---|---|---|---|---|
| 1 | B | B | B | B | ... | B | B |
| 2 | B | B | B | B | ... | B | B |
| 3 | B | B | B | B | ... | B | B |
| 4 | B | B | B | B | ... | B | B |
| | ⋮ | ⋮ | ⋮ | ⋮ | | ⋮ | ⋮ |
| 1079 | B | B | B | B | ... | B | B |
| 1080 | B | B | B | B | ... | B | B |

FIG. 6

| POSITION OF PERIPHERAL PIXEL | POSITION IN TRANSMISSION FRAME | | POSITION IN TRANSMISSION DATA | | | |
|---|---|---|---|---|---|---|
| | START COORDINATE (UPPER LEFT-HAND) | END COORDINATE (LOWER RIGHT-HAND) | TRANSMISSION START LINE NUMBER | NUMBER OF LINES | TRANSMISSION START SAMPLE NUMBER | NUMBER OF SAMPLES |
| UPPER | (8,0) | (4103,7) | 38 | 4 | 0 | 2048 |
| LOWER | (8,2168) | (4103,2175) | 33 | 4 | 0 | 2048 |
| L1 | (0,0) | (7,7) | 38 | 4 | 2192 | 4 |
| L2 | (0,8) | (7,2167) | 42 | 1080 | 2192 | 4 |
| L3 | (0,2168) | (7,2175) | 33 | 4 | 2192 | 4 |
| R1 | (4104,0) | (4111,7) | 38 | 4 | 2186 | 4 |
| R2 | (4104,8) | (4111,2167) | 42 | 1080 | 2186 | 4 |
| R3 | (4104,2168) | (4111,2175) | 38 | 4 | 2186 | 4 |

FIG. 8

| 3G-SDI SIGNAL | | MULTIPLEXING ORDER OF IMAGE DATA |
|---|---|---|
| LINK A | DATA STREAM 1 | Gb1,Gb2,Gb3,⋯,Gb2047,Gb2048 |
| | DATA STREAM 2 | B1,R1,B3,R3,⋯,B2045,R2045,B2047,R2047 |
| LINK B | DATA STREAM 1 | Gr1,Gr2,Gr3,⋯,Gr2047,Gr2048 |
| | DATA STREAM 2 | B2,R2,B4,R4,⋯,B2046,R2046,B2048,R2048 |

ANC DATA PACKET

FIG. 13A

RED

|  | | | | | | | |
|---|---|---|---|---|---|---|---|
| 1 | R | R | R | R | ... | R | R |
| 2 | R | R | R | R | ... | R | R |
| 3 | R | R | R | R | ... | R | R |
| 4 | R | R | R | R | ... | R | R |
|  | ⋮ | ⋮ | ⋮ | ⋮ |  | ⋮ | ⋮ |
| 1079 | R | R | R | R | ... | R | R |
| 1080 | R | R | R | R | ... | R | R |

FIG. 13B

INFORMATION OF COLOR TRANSPARENCY

|  | | | | | | | |
|---|---|---|---|---|---|---|---|
| 1 | A | A | A | A | ... | A | A |
| 2 | A | A | A | A | ... | A | A |
| 3 | A | A | A | A | ... | A | A |
| 4 | A | A | A | A | ... | A | A |
|  | ⋮ | ⋮ | ⋮ | ⋮ |  | ⋮ | ⋮ |
| 1079 | A | A | A | A | ... | A | A |
| 1080 | A | A | A | A | ... | A | A |

FIG. 13C

GREEN

|      | | | | | | |
|------|----|----|----|----|----|----|
| 1    | Gb | Gb | Gb | Gb | ⋯ | Gb | Gb |
| 2    | Gb | Gb | Gb | Gb | ⋯ | Gb | Gb |
| 3    | Gb | Gb | Gb | Gb | ⋯ | Gb | Gb |
| 4    | Gb | Gb | Gb | Gb | ⋯ | Gb | Gb |
|      | ⋮ | ⋮ | ⋮ | ⋮ | | ⋮ | ⋮ |
| 1079 | Gb | Gb | Gb | Gb | ⋯ | Gb | Gb |
| 1080 | Gb | Gb | Gb | Gb | ⋯ | Gb | Gb |

FIG. 13D

BLUE

|      | | | | | | |
|------|---|---|---|---|---|---|
| 1    | B | B | B | B | ⋯ | B | B |
| 2    | B | B | B | B | ⋯ | B | B |
| 3    | B | B | B | B | ⋯ | B | B |
| 4    | B | B | B | B | ⋯ | B | B |
|      | ⋮ | ⋮ | ⋮ | ⋮ | | ⋮ | ⋮ |
| 1079 | B | B | B | B | ⋯ | B | B |
| 1080 | B | B | B | B | ⋯ | B | B |

IMAGE PROCESSING APPARATUS AND IMAGE PROCESSING METHOD

BACKGROUND OF THE INVENTION

1. Field of the Invention

The present invention relates to an image processing apparatus, and particularly, to image data processing that generates transmission data of image data.

2. Description of the Related Art

In the related art, an image pickup apparatus using an image pickup element having a pixel array with a color filter of the Bayer structure was generally known. The image pickup element receives image light via the color filter from an object by a photoelectric conversion element configuring a pixel and outputs an image signal correspondingly to the intensity of the image light. A processing unit at a subsequent stage performs predetermined processing with respect to the image signal to display an image on a viewfinder or an external display apparatus. In general, R, G, and B pixels, which can output R, G, and B signals, respectively, are disposed in the image pickup element in a predetermined pattern.

Further, an apparatus is also discussed, which converts moving image data obtained by the image pickup element of the Bayer structure into a luminance signal and a color difference signal and transmits the signals according to the HD-SDI standard (SMPTE 274M) discussed in Society of Motion Picture and Television Engineers (SMPTE) (see, for example, Japanese Patent Application Laid-Open No. 2002-199414).

In Japanese Patent Application Laid-open No. 2002-199414, the moving image data is converted into luminance and color difference data to be transmitted, and as a result, the moving image data of the Bayer structure could not be transmitted.

SUMMARY OF THE INVENTION

The present invention is contrived to solve the problems. In particular, an aspect of the present invention is to generate transmission data to appropriately transmit information required to process moving image data at the time of transmitting the moving image data output from the image pickup element of the Bayer structure.

According to an embodiment of the present invention, an image processing apparatus includes an obtaining unit configured to obtain moving image data having a pixel array of a Bayer structure, a transmission unit configured to transmit the moving image data obtained by the obtaining unit in accordance with a transmission method of transmitting image data having a pixel array different from the Bayer structure and auxiliary data indicating transparency of a plurality of color data included in the image data, by using a plurality of channels, and a control unit configured to control the transmission unit to transmit image data of predetermined one of a plurality of colors in the moving image data obtained by the obtaining unit, by using a channel for transmitting the auxiliary data where the number of pixels corresponding to the predetermined color is larger than that of other color of the plurality of colors.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram schematically illustrating a pixel array of an image pickup element of the Bayer structure.

FIGS. 5A, 5B, 5C and 5D are diagrams conceptually illustrating a data array configuration when an image signal output from an effective pixel area of the image pickup element of the Bayer structure is stored in a RAM.

FIG. 6 is a diagram illustrating a configuration of a data cable indicating information of peripheral pixel data according to an embodiment of the present invention.

FIG. 8 is a diagram illustrating pixel data distributed to each data stream generated in the signal processing unit.

FIGS. 13A, 13B, 13C and 13D are diagrams illustrating image data obtained by deBayer-processing the pixel data of FIGS. 5A to 5D and information on transparency thereof.

DESCRIPTION OF THE EMBODIMENTS

Preferred embodiments of the present invention will now be described in detail in accordance with the accompanying drawings.

First Embodiment

Figure 1:
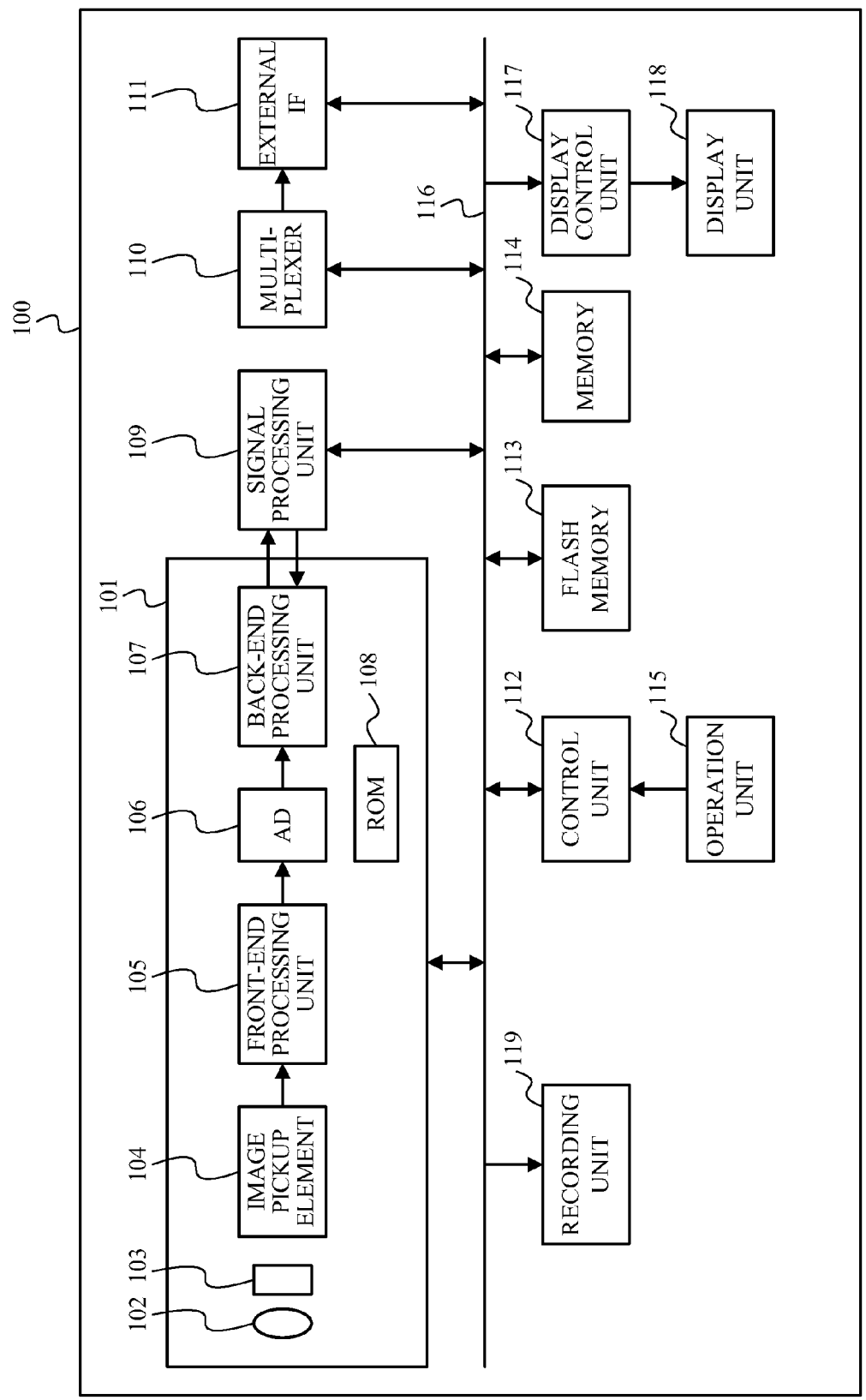
FIG. 1 is a diagram illustrating a block configuration of an image pickup apparatus according to an embodiment of the present invention.

FIG. 1 is a block diagram illustrating a configuration example of an image pickup apparatus according to the present embodiment. The image pickup apparatus of the present embodiment has a first mode for transmitting moving image data of the Bayer structure obtained by an image pickup unit and a second mode for transmitting RGB type moving image data which is deBayer-processed. Each mode may be selectively set as a user operates an operation unit 115 in an image pickup standby state. Further, the image pickup apparatus of the embodiment is configured to multiplex a pixel on the periphery of an effective area (hereinafter, referred to as a peripheral pixel), and combine and transmit information to specify a position of the pixel in a frame and multi-positions of a signal, at the time of transmitting the moving image data of the Bayer structure according to an SDI standard. Therefore, the apparatus may be a transmission apparatus of image data (data transmitting apparatus) as well as the image pickup apparatus.

In FIG. 1, an image pickup unit 101 includes an image pickup lens 102, a shutter 103, an image pickup element 104, a front-end processing unit 105, an A/D converter 106, a back-end processing unit 107, and a ROM 108. The image pickup lens 102 includes a zoom lens and a focus lens. The shutter 103 also serves as an iris function.

The image pickup element 104 has a pixel array by a CCD sensor or a CMOS sensor with a color filter of a Bayer structure illustrated in FIG. 2 and converts an optical image into an electric signal. The image pickup element 104 supplies the electric signal indicating an amount of charge accumulated in the pixel to the front-end processing unit 105 in a progressive manner, at a timing (1/30 seconds in the embodiment) of a clock supplied from a control unit 112 to be described below. The front-end processing unit 105 includes a correlated double sampling (CDS) unit or an automatic gain control (AGC) unit for removing output noise of the image pickup element 104. The front-end processing unit 105 receives the electric signal from the image pickup element and the A/D converter 106 converts an analog signal output from the front-end processing unit 105 into a digital signal.

The back-end processing unit 107 separates image data supplied from the A/D converter 106 into four pixel planes of R, Gr, Gb, and B (red, green, green, and blue), in the first mode. After linear matrix processing of color reproduction is applied to respective components, pixel data of 10 bits of each color is supplied to a signal processing unit 109. Further, in the second mode to be described below, the back-end processing unit 107 separates the supplied image data into pixel planes of R, G, and B and outputs the pixel planes.

As information on the image pickup element 104, a total number of pixels, horizontal and vertical sizes, the positions of an effective pixel, and the like are recorded in the ROM 108.

The signal processing unit 109 performs processing to be described below with respect to the supplied pixel data of R, Gr, Gb, and B, and generates data of a format suitable for transmission and stores the generated data in a memory 114. A multiplexer 110 reads out the data to be transmitted, from the memory 114 and multiplexes the read-out data, and sends the corresponding data to an external interface 111. The external IF 111 transmits moving image data to the outside according to a Serial Digital Interface (SDI) standard.

A control unit 112 includes a CPU and controls each unit of the image pickup apparatus 100 according to controlling software stored in a flash memory 113. The control unit 112 detects an input from an operation unit 115 and controls the image pickup unit 101, the signal processing unit 109, and the multiplexer 110 while synchronizing with timings. The control unit 112 temporarily records data generated in various processings, in the memory 114, and reads out the data as necessary. A program which is electrically erasable and recordable, and is required to operate the control unit 112 or unique adjustment data of the image pickup apparatus 100 is, in advance, written in the flash memory 113. A display control unit 117 generates moving image data for display, by performing predetermined processing such as deBayer processing with respect to the moving image data of the Bayer structure obtained from the image pickup unit 101, and sends the generated moving image data to a display unit 118. The display unit 118 displays the picked-up moving image data. For example, the deBayer processing includes interpolation processing for RAW data. A recording unit 119 encodes the moving image data output from the image pickup unit 101 by a known encoding method such as H.264, and the like to compress an information amount, and records the compressed data in a recording medium (not illustrated). Each component described above is connected with an internal bus 116 which is a transmission path for a control signal or a data signal between the respective components.

In the image pickup apparatus 100, when power is input from the operation unit 115, the control unit 112 controls each unit, and displays the image data, which is picked up by the image pickup unit 101, on the display unit 118 to go into an image pickup standby state. In the image pickup standby state, when an instruction of an image pickup start is received from the operation unit 115, the control unit 112 controls each unit as described below and outputs the picked-up image data from the external IF 111. When an instruction of image pickup stop is received, the control unit 112 stops outputting the image data from the external IF 111. Further, the control unit 112 records the picked-up moving image data by controlling the recording unit 119 in accordance with the instruction of the image pick-up start and stops recording the moving image data in accordance with the instruction of the image pickup stop.

First, processing of the first mode will be described. The first mode may be set as the user operates the operation unit 115 in the image pickup standby state.

Figure 3:
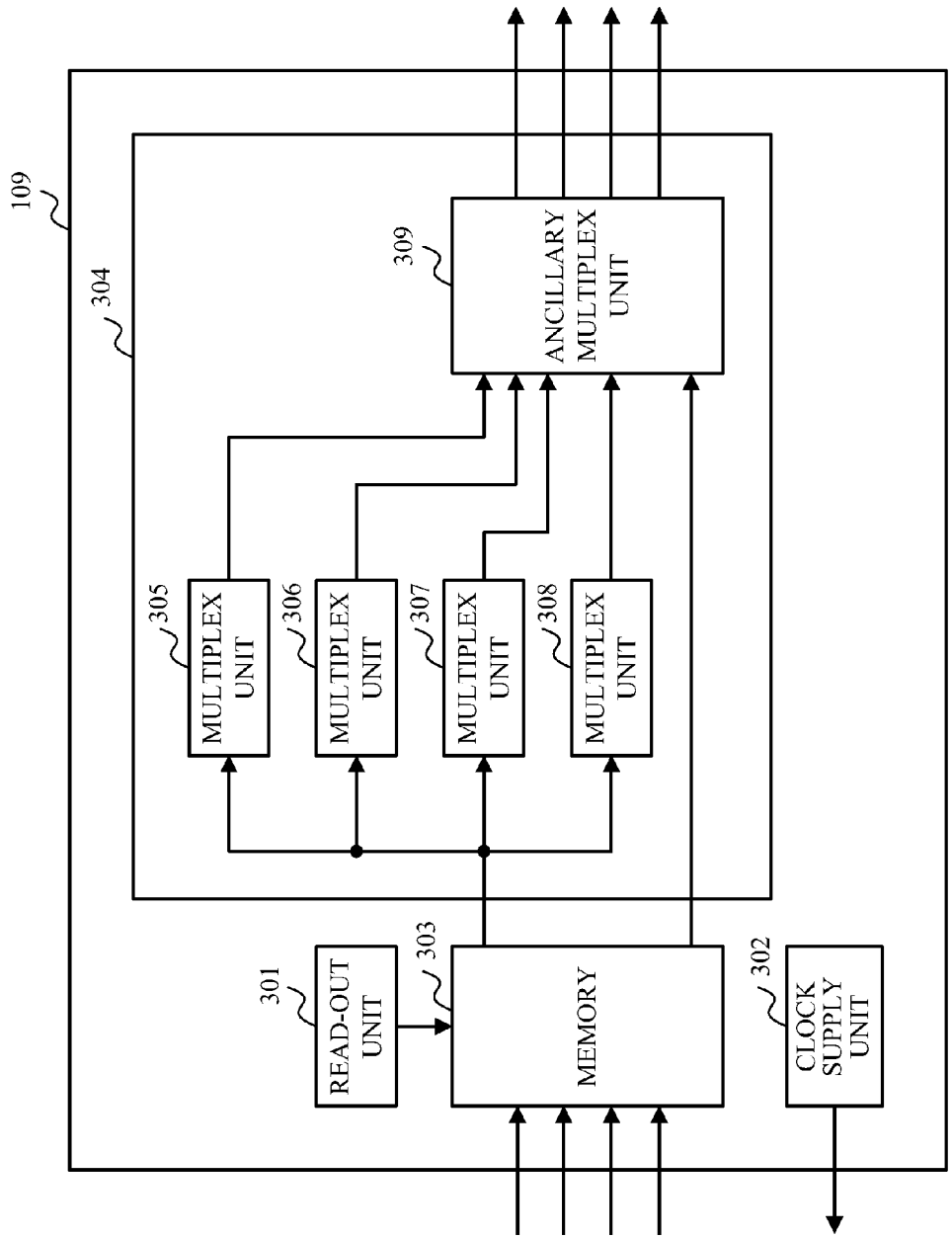
FIG. 3 is a block diagram illustrating a configuration of a signal processing unit of the image pickup apparatus of FIG. 1.

FIG. 3 illustrates a configuration of the signal processing unit 109. A memory 303 temporarily stores the data of the pixel of each color received from the back-end processing unit 107 of the image pickup unit 101 (image data acquiring unit). A clock supply unit 302 supplies a read-out clock of the data of the pixel to the back-end processing unit 107. The pixel data supplied to the memory 303 from the back-end processing unit 107 is stored in the memory 303 by dividing the pixel data into data of an effective pixel and data of a peripheral pixel, by the control unit 112. A read-out unit 301 reads out the data of the pixel from the memory 303 and supplies the read-out data to a signal multiplexing unit 304. Further, as the memory 303, a part of a storage area of the memory 114 may be used.

The signal multiplexing unit 304 rearranges the supplied pixel data in an order suitable for transmission, multiplexes a timing reference signal start of active video (SAV)/end of active video (EAV), and generates a data stream by further multiplexing various ancillary data.

Subsequently, an operation when the control unit 112 records the pixel data supplied from the back-end processing unit 107 in the memory 303 will be described.

Figure 4:
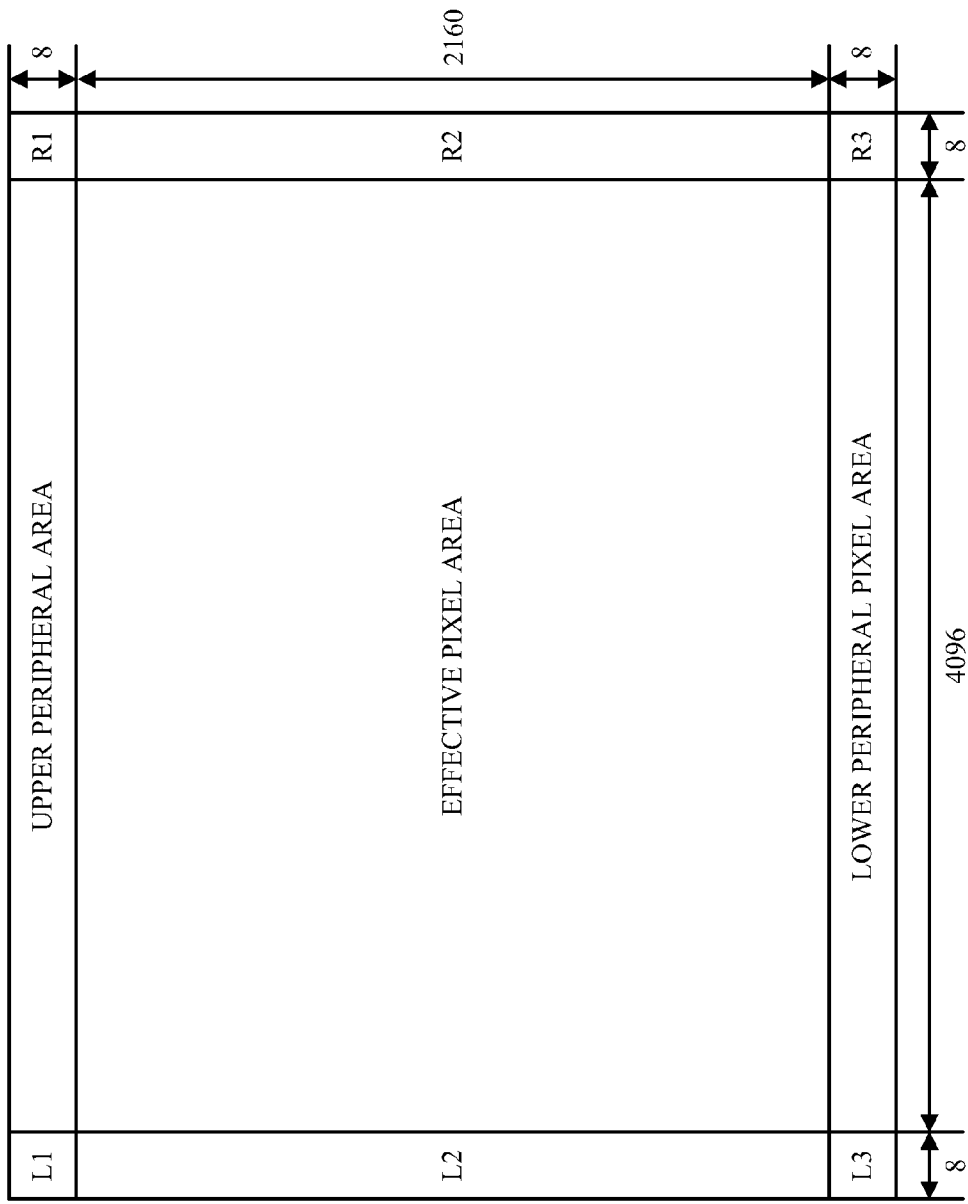
FIG. 4 is a diagram schematically illustrating a configuration of a pixel layout in a pixel area of the image pickup element.

For example, a case in which the pixel area on the image pickup element 104 is configured in a layout of FIG. 4 will be described. As illustrated in FIG. 4, the image pickup element 104 is constituted by an effective pixel area and a peripheral pixel area. A pixel data group, which is obtainable at one time from an entire area of the pixel array, is defined as a RAW frame. The number of pixels of the RAW frame is 4112 (4096+8+8) in horizontal (lateral) and the number of pixels is 2176 (2160+8+8) in vertical (longitudinal), and the pixels are arranged in the Bayer structure.

The control unit 112 reads information on vertical and horizontal widths of the aforementioned pixel array and the position of each area and information on an arrangement method of each pixel of the Bayer structure from the ROM 108. The control unit 112 controls a recording timing based on information on the image pickup element 104, and divides the signal supplied from the back-end processing unit 107 into the effective pixel data and the peripheral pixel data and records the divided data in different areas of the memory 303. The peripheral pixel data is used in the interpolation processing, and the like in the deBayer processing of the effective pixel data.

FIGS. 5A to 5D illustrate pixel data of respective colors R, Gr, Gb, and B of the effective pixel areas constituting the RAW frame, which the control unit 112 records in the memory 303. In the case of a pixel group of each color, the horizontal number of pixels is 2048 in horizontal and the vertical number of pixels is 1080 in vertical. Further, the control unit 112 stores the data of the peripheral pixels located in eight areas (an upper side portion, a lower side portion, left side portions L1, L2, and L3, and right side portions R1, R2, and R3) illustrated in FIG. 4 in the memory 303, distinguishably from the pixel data of the effective pixel area.

In this case, the control unit 112 prepares a data table illustrated in FIG. 6 and stores the prepared data table in the memory 114 in association with the data of the peripheral pixel. The data table indicates set values of the position of the data of each peripheral pixel in the RAW frame and multiplexing positions in a transmission signal at the time of transmitting the data of the peripheral pixel. The control unit 112 calculates the position and range of each peripheral pixel data from the information on the configuration of the RAW frame. Further, the control unit 112 selects the multiplexing positions, which are set in advance with respect to the transmission signals, in accordance with a combination of the information of the RAW frame and a transmission method.

The set values of the multiplexing positions in the signals illustrated in FIG. 6 are shown as one example. Since the numbers of lines and samples of a digital active line and a blanking area differ according to the transmission method, the multiplexing positions of the peripheral pixel data are set according to a format of the RAW frame. The peripheral pixel data may be multiplexed with respect to a position in the blanking area where other signals are not multiplexed. The above is explanation of the operation when the control unit 112 records the pixel data supplied from the back-end processing unit 107 in the memory 303.

Figure 7:
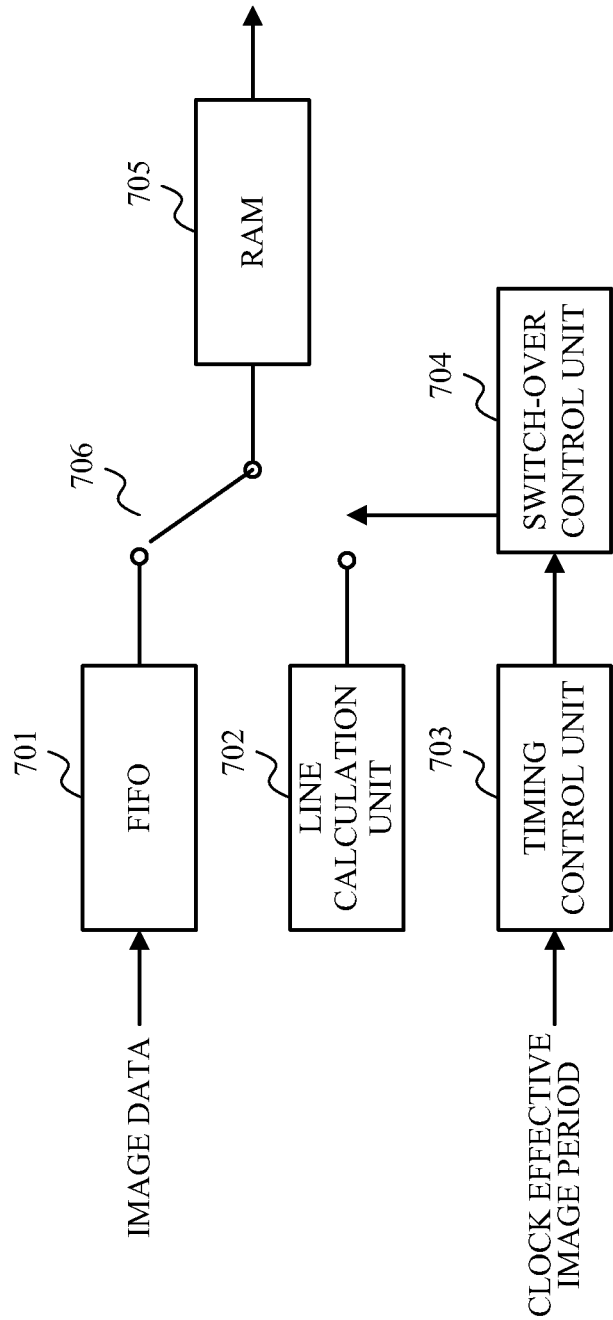
FIG. 7 is a block diagram illustrating a configuration of a multiplexing unit included in the signal processing unit of FIG. 3.

Subsequently, operations of multiplexing units 305 to 308 will be described. FIG. 7 illustrates a configuration example which is common to the multiplexing units 305 to 308.

A FIFO 701 stores input pixel data in synchronization with a writing clock supplied from the control unit 112. In this case, the control unit 112 distributes the pixel data of each color to the multiplexing units 305 to 308 according to a multiplexing structure of the transmitted pixel data, respectively.

In the present embodiment, the moving image data is transmitted according to the SDI standard. In detail, the moving image data conforms with level B of SMPTE ST 425 (3G-SDI) and a multiplexing structure of 10 bits of R'G'B'+A of SMPTE ST 372 (dual link) is applied to distribute each pixel data. Further, a sample format of a pixel conforms with 2048× 1080/30P defined as SMPTE ST 2048-2.

FIG. 8 illustrates a distribution configuration of a plurality of channels (four channels) of the pixel data multiplexed during an effective image period (digital active line) according to that standard. According to the distribution configuration, the control unit 112 sequentially supplies the pixel data to the respective multiplexing units that generate the data stream. For example, the multiplexing unit 305 receives the pixel data in the order of Gb(1), Gb(2), . . . Gb(2048) and generates a data stream 1 of Link A. Further, a data stream 1 of Link B is assigned as channel A (alpha) defined according to the SDI. In general, the channel A is used to transmit auxiliary data separate from data of color expression with respect to each pixel. However, in the first mode of the present embodiment, a part of pixel data (G pixel) having the number of pixels relatively larger than that of other color of the plurality of colors is multiplexed to the data stream corresponding to an alpha channel in order to transmit the image data of the Bayer structure. In the first mode of the present embodiment, the multiplexing unit 305 assigns pixel data of Gr pixel to the channel A. Image data of color other than the corresponding color is distributed to data streams of other channels and multiplexed.

The control unit 112 supplies the peripheral pixel data of eight areas recorded in the memory 303 to the FIFO 701 in the same distribution method. A supply timing is calculated according to the multiplexing positions (sample positions) set in FIG. 6.

A line calculation unit 702 generates an identifier (SAV/EAV) for recognizing a pause position of an image signal with respect to a receiving apparatus that receives the moving image data output from the image pickup apparatus 100. Further, the line calculation unit 702 generates line number management data LN (line number) and transmission error check data CRCC (cyclic redundancy check code). A timing control unit 703 receives a read-out clock to control a timing of reading out the pixel data from the control unit 112 and timing information of the effective image period (digital active line) and the vertical/horizontal blanking period. The timing information of the effective image period is a period in which the data of the effective pixel is multiplexed to the signal of the data stream. In addition, the timing information of the blanking period is a period in which the data of the peripheral pixel area is multiplexed. Timing information of multiplexing the peripheral pixel data of each area is calculated from the information of the data table of FIG. 6 by the control unit 112. The timing control unit 703 generates a timing pulse for multiplexing the pixel data.

A switch-over control unit 704 controls a switch-over unit 706 to select one side of the outputs from the FIFO 701 and the line calculation unit 702 and output the one selected output to a RAM 705. The switch-over control unit 704 switches over a timing of reading out the pixel data from the FIFO 701 which conforms with the supplied timing pulse. While switching over the read-out timing, the switch-over control unit multiplexes the pixel data to the data stream which is being generated and multiplexes thereto the SAV/EAV, the LN, and the CRCC.

Figure 9:
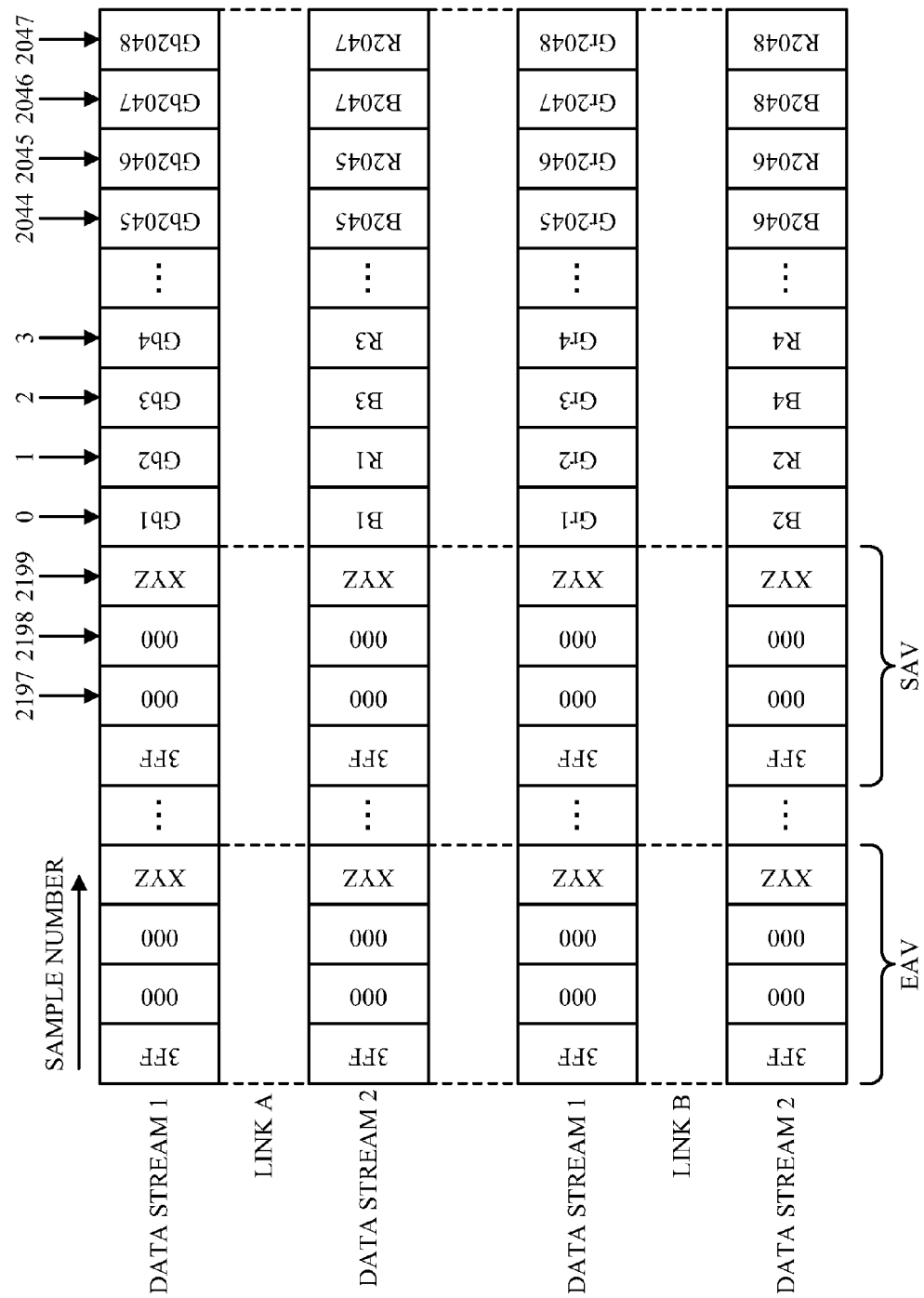
FIG. 9 is a diagram illustrating a data structure when one line of pixel data in storage data of FIGS. 5A to 5D is multiplexed to four data streams corresponding to one line.

By the above-described operation, the multiplexing units 305 to 308 store the data stream in the respective RAMs 705. FIG. 9 illustrates a result of multiplexing one line of pixel data in each pixel plane illustrated in FIGS. 5A to 5D to four (four channels) data streams corresponding to one line (the multiplexed peripheral pixel data is omitted). For example, the numeral "3" of Gb3 indicates the pixel order starting from left pixel data of a pixel plane of Gb.

Herein, the pixel data of R, Gr, Gb, and B arranged in two lines, which constitute the RAW frame, are respectively multiplexed to the data stream of one line.

Figure 10:
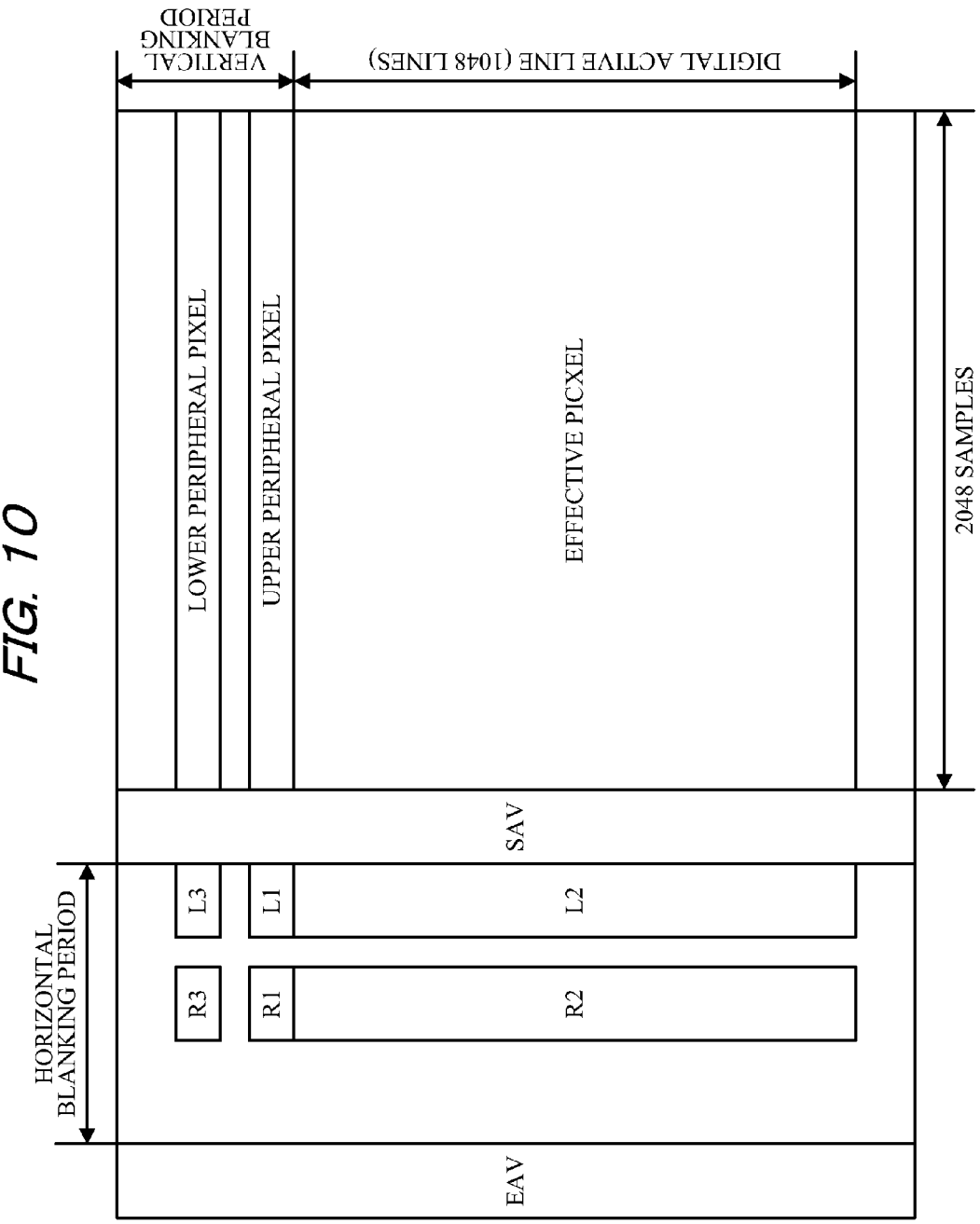
FIG. 10 is a diagram illustrating a data configuration of a data stream generated with respect to one RAW frame.

FIG. 10 illustrates a configuration of data of a data stream corresponding to one sheet of RAW frame generated by each multiplexing unit. In the peripheral pixel data, a sample position (sample number in the figure) is specified in accordance with information of multiplexing positions of the data table of FIG. 6 and the peripheral pixel data is multiplexed to the blanking area.

In FIG. 3, an ancillary multiplexing unit 309 multiplexes a time code, a payload ID, and the information of the data table of FIG. 6 to the data stream supplied by the multiplexing units 305 to 308. A multiplexing method conforms with an SMPTE 291.

Figure 11:
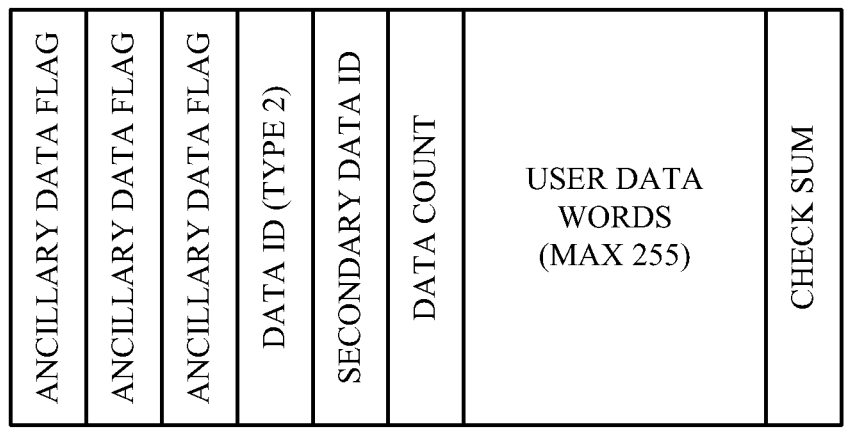
FIG. 11 is a diagram illustrating a configuration of an ANC packet storing information of a data table.

The ancillary multiplexing unit 309 stores the information of the data table, which is read out from the memory 114, in a user data word area configured in each 10 bit of an ancillary packet (ANC packet) of Type 2 illustrated in FIG. 11. As a format of the stored data, even any data format in which the respective information may be obtained as a value may be used. Further, a type of the ANC packet is identified with a data identifier (DID) and a secondary data identifier (SDID) which are header areas. A predetermined value indicating information (meta information) on the data table defined in the embodiment is set in the identifiers.

Figure 12:
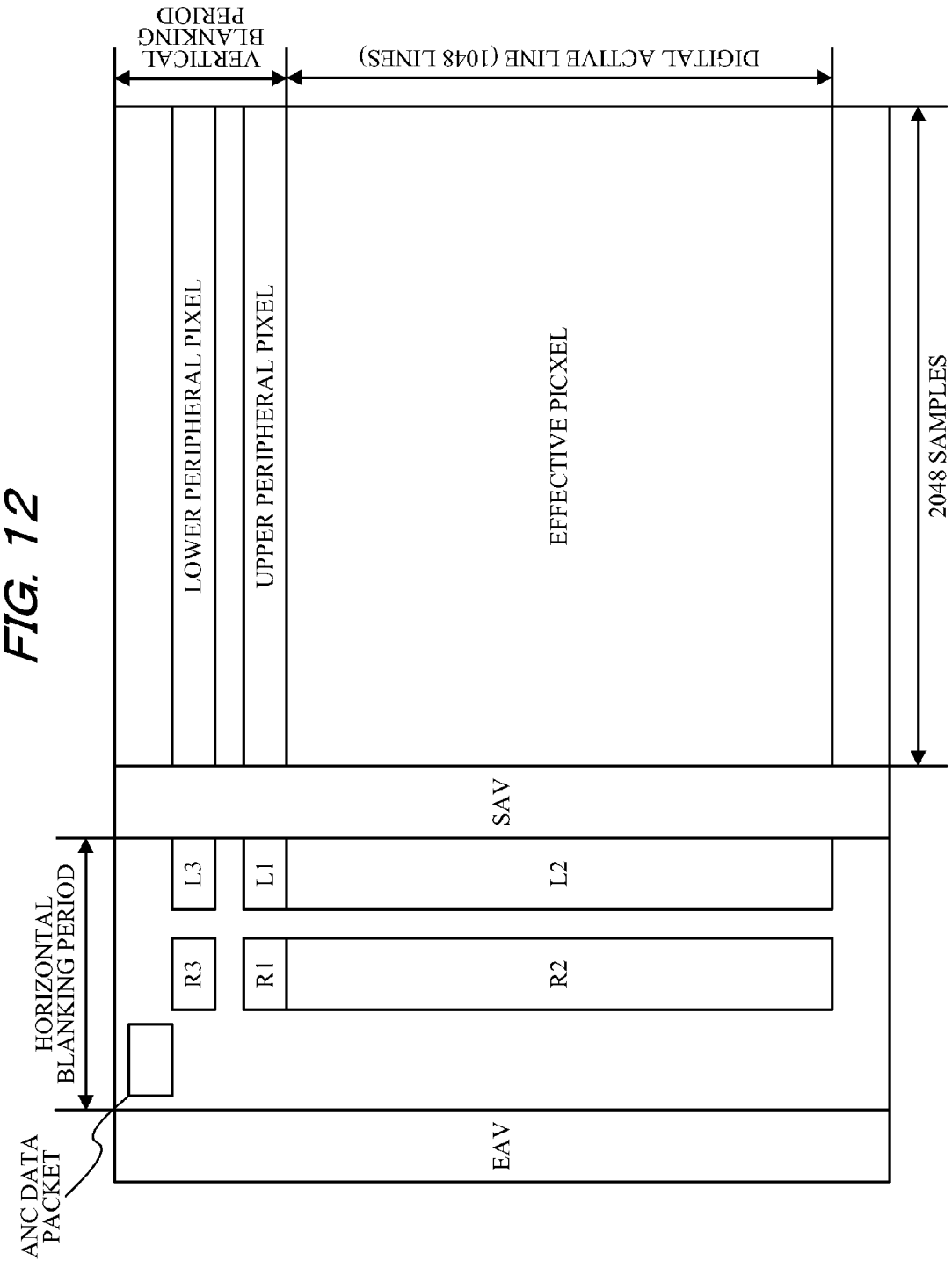
FIG. 12 is a diagram illustrating a data configuration of a data stream obtained by multiplexing the ANC packet storing the information of the data table.

For one example, the ancillary multiplexing unit 309 multiplexes the ANC packet to the horizontal blanking area designated as a line number 6 of a data stream 1 of Link A. FIG. 12 illustrates a configuration of data of a data stream obtained by multiplexing the ANC packet.

The multiplexer 110 alternately multiplexes four data streams, in which various ANC packets are multiplexed by the ancillary multiplexing unit 309, by the unit of word in conformity with the SMPTE ST 425 into a single data stream and transmits the single data stream to the outside as a signal of 3G-SDI.

An external receiving apparatus that receives the signal of 3G-SDI may detect the ANC packet storing the information on the peripheral pixel data from header information. As a result, the receiving apparatus may extract the received information of the user data word and specify line numbers and sample numbers of data streams in which respective peripheral pixel data of an upper side portion, a lower side portion, L1 to L3, and R1 to R3 are multiplexed. For example, in the case of the peripheral pixel data of L1, a transmission start line number, the number of lines, a transmission start sample number, and the number of samples are 38, 4, 2192, and 4, respectively, as illustrated in FIG. 6. The receiving apparatus may obtain sample data of a corresponding range as the peripheral pixel data of L1 in the received signal of 3G-SDI as long as the information of the multiplexing positions can be obtained.

Further, the receiving apparatus may perform processing of reconfiguring an original RAW frame by using eight peripheral pixel data of the upper side portion, the lower side portion, L1 to L3, and R1 to R3 which are obtained as above. As a result, the receiving apparatus uses information of a range (see FIG. 6) in the RAW frame extracted from the user data word. Specifically, since values of a start coordinate and an end coordinate of an area in which the respective peripheral pixel data are disposed in the RAW frame may be obtained, eight peripheral pixel data of the RAW frame are reproduced on the memory on the basis of those the values. In addition, the effective pixel data is extracted from the received 3G-SDI signal and the effective pixel data is transmitted to an area surrounded by the area of the peripheral pixel data. By this configuration, the RAW frame may be reconfigured.

Further, in the embodiment, as information which specifies a position of multiplexing the peripheral pixel data, information of a line number, a sample number, the number of lines, and the number of samples, which are multiplexed to the signal of the SDI, are set. However, as the information which specifies the multiplexing positions, a method using information of an ID, which may uniformly specify the multiplexing positions by, for example, a combination of a product number and an operation mode of a camera, and the like, may be used.

In the signal of the SDI, in the case where information other than an effective pixel is multiplexed, the information is stored in the ANC packet to be superimposed on the blanking area. The data of the peripheral pixels located in the upper side portion and the lower side portion of the effective pixel as in the present embodiment, require multiplexing areas of several lines. In the case where the peripheral pixel data is stored in the user data word (255 words) of the ANC packet, the peripheral pixel data is divided into a plurality of packets to be stored. In this regard, in the present embodiment, the peripheral pixel data is not stored in the ANC packet but multiplexed to the blanking area. That is, when the data of the peripheral pixel is multiplexed to the blanking area of the data stream of the SDI, the same method as the multiplexing method of the pixel data in the digital active line is applied. This is a method of efficiently multiplexing the peripheral pixel data to an area on the signal of the SDI. As a result, as compared with the case in which the peripheral pixel data is stored and multiplexed in the ANC packet, the ANC packet header, which is redundant data, need not be multiplexed, and thus multiplexing areas may not be used needlessly.

Further, as described above, for the multiplexed peripheral pixel data, information on multiplexing positions thereof and positional information of the peripheral pixel data thereof in the original RAW frame are stored in the ANC packet to be transmitted. As a result, a receiving side may accurately receive the packet according to a standard method which conforms with the SMPTE 291.

The recording apparatus may specify and extract a position on the transmission signal where the peripheral pixel data of the effective pixel is multiplexed, by only analyzing the ANC packet.

In the present embodiment, data of an effective pixel of 4096×2048 configured in the Bayer structure and data of a peripheral pixel are transmitted. This pixel data may be converted into image data constituted by RGB signals, by being reconfigured into an arrangement of the RAW frame of the Bayer structure in a workflow of a postprocess and thereafter, subjected to deBayer processing.

Further, when the deBayer processing is performed, the peripheral pixel data transmitted in the present embodiment may be used in order to correctly develop peripheral areas which are located respectively in left, right, upper and lower side portions of the effective pixel area of 4096×2048.

As such, according to the present invention, moving picture frame data obtained in the pixel array of the Bayer structure may be transmitted as a data stream of a multiplexing structure of 10 bits of R'G'B'+A. Further, in this case, since information of shortage of a pixel for interpolation processing of an area of a frame end is multiplexed to a predetermined position of the data stream, conversion of the received image data of the Bayer structure may be accurately performed.

Further, the image processing configuration of the present invention may be applied even to an apparatus, which has a data processing function and a transmission function, such as a PC, and the like as well as the image pickup apparatus. In addition, only data processing of the present invention may be performed in other apparatuses and the image processing configuration may be applied even to other apparatuses in the case where the processed data is supplied and transmitted to the apparatus having a communication function, such as the PC, and the like.

Subsequently, the second mode will be described. In the first mode, the pixel data of Gr is multiplexed and transmitted to channel A of the signal of the 3G-SDI. This is a method of multiplexing the pixel data of 4096×2048 configured in the Bayer structure to the digital active line of the 3G-SDI.

As described above, in general, the channel A is used to transmit auxiliary data different from data of color expression with respect to each pixel. For example, a printer or a display apparatus expresses colors by combinations of single colors, such as RGB, cyan, magenta, yellow, black (CMYK), and the like. A lot of colors which human recognizes may be expressed by adjusting the brightness or concentration of each single color. Further, in image processing software, data of another color of the plurality of colors, which is not directly displayed, other than the displayed single colors, may be added. The color data are used in a mask of the image, synthesis of a plurality of images, and the like.

The second mode of the present embodiment is a mode to multiplex and transmit information of transparency of a color to the channel A together with moving picture signals of R, G, and B. Herein, an example in which the moving image data constituted by RGB of horizontal 2048 pixels and vertical 1080 pixels is transmitted is described.

As described above, when an instruction of a transmission start is received in an image pickup standby state in which the second mode is set, the control unit 112 controls each unit to start image processing for transmission.

The image data of the Bayer structure output from the image pickup unit 101 is supplied to the back-end processing unit 107. The back-end processing unit 107 performs deBayer processing to the supplied image data and generates image data of horizontal 2048 pixels×vertical 1080 pixels configured by R, G, and B (red, green, and blue) by reducing the number of pixels. Further, the back-end processing unit 107 sets transparency of a color corresponding to each pixel as a value (0 to 255) of maximum 8 bits according to an input of the operation unit 115. For example, in the case where the color is completely transparent, transparency is set as 0 and in the case where the color is opaque, the transparency is set as 255. In the second mode of the present embodiment, the auxiliary data is transmitted by using the channel A.

FIGS. 13A to 13D illustrate moving image data of one frame generated by the back-end processing unit 107 and transparency described above. The data (including the channel A) of the pixel corresponding to one frame illustrated in FIGS. 13A to 13D is supplied to the signal processing unit 109 from the back-end processing unit 107. The signal processing unit 109 multiplexes and outputs the supplied pixel data in a format corresponding to the data stream defined as the signal of the 3G-SDI. Herein, the signal processing unit 109 multiplexes each pixel data by applying the multiplexing structure of 10 bits of R'G'B'+A of SMPTE ST 372 (dual link). The information of transparency of the color of each pixel, which becomes the information of the channel A, is multiplexed to the data stream 1 of Link B.

As such, according to the second mode of the present embodiment, it is possible to provide transmission data for transmitting the R, G, and B signals obtained by deBayer-processing the image data of the Bayer structure, in accordance with the 3G-SDI standard together with the auxiliary information.

Further, in the aforementioned embodiment, the generation configuration of the transmission data of the image data illustrated in FIGS. 3, 6 to 9, and 11 may be implemented by reading out a program for implementing each function included in the corresponding configuration from the memory 113 and by executing the read-out program by a CPU of the control unit 112.

In this case, functions of all or some of respective processing according to the configurations illustrated in FIGS. 3, 6 to 9, and 11 may be implemented by exclusive hardware. Further, the memory is not limited to a nonvolatile memory such as the flash memory, and the like and may adopt a magneto-optical disk device, a recording medium, which is capable of only reading out data, such as a CD-ROM, and the like, and a volatile memory other than the RAM. In addition, the memory may be configured by a recording medium which is readable and writable by a computer by combinations thereof.

Further, the program for implementing the function of the generation processing of the transmission data of the present invention is recorded in a computer-readable recording medium and the program recorded in the recording medium is read and executed by a computer system to implement each processing. In addition, the "computer system" described herein includes hardware such as an OS or a peripheral device. Specifically, a program which is read out from a storage medium is written in a memory provided in a function extension board inserted in the computer or a function extension unit connected to the computer. Thereafter, a CPU, and the like provided in the function extension board or the function extension unit perform some or all of actual processing, based on an instruction of the program and the functions of the embodiment may also be implemented by the processing.

Further, the "computer-readable recording medium" represents storage devices such as a flexible disk, a magneto-optical disk, a ROM, a portable medium such as a CD-ROM, and the like, a hard disk embedded in the computer system, and the like. In addition, the "computer-readable recording medium" includes even a medium that holds a program for a predetermined time. For example, the computer-readable recording medium includes a volatile memory (RAM) in the computer system which becomes a server or a client when the program is transmitted via a network such as the Internet, and the like or a communication line such as a telephone line, and the like.

Further, the program may be transmitted to other computer systems from the computer system storing the program in the storage device via a transmission medium or by a transmission wave in the transmission medium. Herein, the "transmission medium" that transmits the program represents a medium that serves to transmit information such as the network (communication network) such as the Internet, and the like or the communication line such as the telephone line.

Further, the program may be used to implement some of the functions. In addition, the program may implement the functions by a combination of the function with a program which is already recorded, that is, may be a so-called differential file (differential program).

Further, a program product such as a computer-readable recording medium having the program recorded therein may also be applied as the embodiment of the present invention. The program, the recording medium, the transmission medium, and the program product are included in a scope of the present invention.

As described above, although the embodiments of the present invention have been described in detail with reference to the accompanying drawings, a detailed configuration is not limited to the embodiments and a design of a scope which does not depart from the spirit of the present invention, and the like are also included.

This application claims the benefit of Japanese Patent Application No. 2012-079536, filed on Mar. 30, 2012, which is hereby incorporated by reference herein in its entirety.

What is claimed is:
1. An image processing apparatus comprising:
an obtaining unit configured to obtain moving image data having a pixel array of a Bayer structure;
a transmission unit configured to transmit the moving image data obtained by the obtaining unit in accordance with a transmission method of transmitting moving image data having a pixel array different from the Bayer structure and auxiliary data indicating transparency of a plurality of pieces of color data included in the moving image data of the different pixel array by using a plurality of channels; and
a generation unit configured to generate the moving image data of the different pixel array from the moving image data obtained by the obtaining unit;

a setting unit configured to set an one of a plurality of modes including a first mode to transmit the moving image data having the pixel array of the Bayer structure and a second mode to transmit the moving image data of the different pixel array; and a control unit configured to control the transmission unit, wherein the control unit controls, in the first mode, the transmission unit to transmit image data of predetermined one of a plurality of colors in the moving image data obtained by the obtaining unit where the number of pixels corresponding to the predetermined color is larger than that of other color of the plurality of colors by using a channel for transmitting the auxiliary data and image data of a color other than the predetermined color in the moving image data obtained by the obtaining unit by using a channel other than the channel for the auxiliary data, and controls, in the second mode, the transmission unit to transmit the moving image data having the different pixel array generated by the generation unit and auxiliary data relating to the moving image data having the different pixel array by using the plurality of channels.

2. An apparatus according to claim 1, wherein the image data of the predetermined color is data corresponding to a G pixel in the pixel array of the Bayer structure.

3. An apparatus according to claim 1, wherein the transmission unit transmits the moving image data obtained by the obtaining unit by using four channels in the first mode, and transmits the auxiliary data by using the channel for the auxiliary data among the four channels and transmits the moving image data having the different pixel array by using the remaining three channels, in the second mode.

4. An image processing apparatus comprising:
an obtaining unit configured to obtain moving image data having a pixel array of a Bayer structure, the moving image data including data of R pixels, G pixels, and B pixels and the number of the G pixels being more than those of the R pixels and the B pixels;

a transmission unit configured to transmit the moving image data obtained by the obtaining unit in accordance with a 3G-SDI method for transmitting data of R pixels, G pixels, and B pixels included in image data having a different pixel array from the Bayer structure and auxiliary data by using four channels;

a generation unit configured to generate the moving image data of the different pixel array from the moving image data obtained by the obtaining unit;

a setting unit configured to set any one of a plurality of modes including a first mode to transmit the moving image data having the pixel array of the Bayer structure and a second mode to transmit the moving image data of the different pixel array;

a control unit configured to control the transmission unit, wherein the control unit controls, in the first mode, the transmission unit to transmit some data of the G pixels in the moving image data obtained by the obtaining unit by using the channel for the auxiliary data and transmit data of the R pixels and the B pixels, and G pixels other than the some data in the moving image data obtained by the obtaining unit by using three channels other than the channel for the auxiliary data, and controls, in the second mode, the transmission unit to transmit data of R pixels, G pixels, and B pixels included in the moving image data having the different pixel array generated by the generation unit by using the three channels other than the channel for the auxiliary data.

5. An image processing method comprising:
obtaining moving image data having a pixel array of a Bayer structure;

transmitting the moving image data obtained in the acquiring in accordance with a transmission method of transmitting moving image data having a pixel array different from the Bayer structure and auxiliary data indicating transparency of a plurality of pieces of color data included in the moving image data of the different pixel array by using a plurality of channels; and generating the moving image data of the different pixel array from the moving image data obtained in the obtaining;

setting any one of a plurality of modes including a first mode to transmit the moving image data having the pixel array of the Bayer structure and a second mode to transmit the moving image data of the different pixel array;

wherein the transmitting transmits, in the first mode, image data of predetermined one of a plurality of colors in the moving image data obtained in the obtaining where the number of pixels corresponding to the predetermined color is larger than that of other color of the plurality of colors, by using a channel for transmitting the auxiliary data and image data of a color other than the predetermined color in the moving image data obtained by the obtaining unit by using a channel other than the channel for the auxiliary data, and wherein the transmitting transmits, in the second mode, the moving image data having the different pixel array generated by the generation unit and auxiliary data relating to the moving image data having the different pixel array by using the plurality of channels.

6. An image processing method comprising:
obtaining moving image data having a pixel array of a Bayer structure, the moving image data including data of R pixels, G pixels, and B pixels and the number of the G pixels being more than those of the R pixels and the B pixels;

transmitting the moving image data obtained in the acquiring in accordance with a 3G-SDI method for transmitting data of R pixels, G pixels, and B pixels included in image data having a different pixel array from the Bayer structure and auxiliary data by using four channels;

generating the moving image data of the different pixel array from the moving image data obtained in the obtaining;

setting any one of a plurality of modes including a first mode to transmit the moving image data having the pixel array of the Bayer structure and a second mode to transmit the moving image data of the different pixel array;

wherein the transmitting transmits, in the first mode, some data of the G pixels in the moving image data obtained in the acquiring by using the channel for the auxiliary data and transmit data of the R pixels and the B pixels, and G pixels other than the some data in the moving image data obtained in the acquiring by using three channels other than the channel for the auxiliary data; and wherein the transmitting transmits, in the second mode, data of R pixels, G pixels, and B pixels included in the moving image data having the different pixel array generated in the generating by using the three channels other than the channel for the auxiliary data.

7. An image processing apparatus comprising:
an obtaining unit configured to obtain moving image data having a pixel array of a Bayer structure;

a transmission unit configured to transmit the moving image data obtained by the obtaining unit in accordance with a transmission method of transmitting moving image data having a pixel array different from the Bayer structure and auxiliary data by using a plurality of channels; and a generation unit configured to generate the moving image data of the different pixel array from the moving image data obtained by the obtaining unit;

a setting unit configured to set any one of a plurality of modes including a first mode to transmit the moving image data having the pixel array of the Bayer structure and a second mode to transmit the moving image data of the different pixel array; and a control unit configured to control the transmission unit in accordance with the mode set by the setting unit, wherein the control unit controls, in the first mode, the transmission unit to transmit image data of predetermined one of a plurality of colors in the moving image data having the pixel array of the Bayer structure obtained by the obtaining unit by using a channel for transmitting the auxiliary data and image data of a color other than the predetermined color in the moving image data having the pixel array of the Bayer structure obtained by the obtaining unit by using a channel other than the channel for transmitting the auxiliary data, and controls, in the second mode, the transmission unit to transmit the moving image data of the different pixel array generated by the generation unit by using the channel other than the channel for transmitting the auxiliary data.

8. An apparatus according to claim 7, wherein the data of the predetermined color is data corresponding to a G pixel in the pixel array of the Bayer structure.

9. An apparatus according to claim 7, wherein the generation unit generates the image data of the different pixel array by performing a deBayer process on the moving image data having the pixel array of the Bayer structure obtained by the obtaining unit.

10. An apparatus according to claim 7, wherein the transmission unit transmits image data in accordance with a 3G-SDI method.

11. An apparatus according to claim 7, wherein the obtaining unit includes an image sensor having a pixel array of the Bayer structure.

12. An image processing method comprising:

obtaining moving image data having a pixel array of a Bayer structure;

transmitting the moving image data obtained in the obtaining in accordance with a transmission method of transmitting moving image data having a pixel array different from the Bayer structure and auxiliary data by using different channels of a plurality of channels; and generating the moving image data of the different pixel array from the moving image data obtained in the obtaining;

setting any one of a plurality of modes including a first mode to transmit the moving image data having the pixel array of the Bayer structure and a second mode to transmit the moving image data of the different pixel array;

wherein the transmitting transmits, in the first mode, image data of predetermined one of a plurality of colors in the moving image data having the pixel array of the Bayer structure obtained in the obtaining by using a channel used for transmitting the auxiliary data and image data of a color other than the predetermined color in the moving image data having the pixel array of the Bayer structure obtained in the obtaining by using a channel other than the channel for the auxiliary data, and wherein the transmitting transmits, in the second mode, the moving image data of the different pixel array generated in the generating by using the channel other than the channel for transmitting the auxiliary data.

* * * * *